United States Patent
Zhang et al.

(10) Patent No.: US 12,432,293 B2
(45) Date of Patent: Sep. 30, 2025

(54) ELECTRONIC DEVICE HOLDER

(71) Applicant: Shenzhen Lanhe Technologies Co., Ltd., Shenzhen (CN)

(72) Inventors: Bo Zhang, Guangdong (CN); Kai Luo, Guangdong (CN); Tielong Hu, Guangdong (CN); Peirong Yu, Guangdong (CN)

(73) Assignee: Shenzhen Lanhe Technologies Co., Ltd., Shenzhen (CN)

( * ) Notice: Subject to any disclaimer, the term of this patent is extended or adjusted under 35 U.S.C. 154(b) by 481 days.

(21) Appl. No.: 17/933,488

(22) Filed: Sep. 20, 2022

(65) Prior Publication Data

US 2023/0057770 A1  Feb. 23, 2023

Related U.S. Application Data

(63) Continuation-in-part of application No. PCT/CN2021/136910, filed on Dec. 9, 2021.

(30) Foreign Application Priority Data

Jan. 7, 2021 (CN) .......................... 202120042894.6
Feb. 22, 2022 (CN) .......................... 202220365370.5

(51) Int. Cl.
*H04M 1/00* (2006.01)
*H01F 7/02* (2006.01)
*H04M 1/04* (2006.01)

(52) U.S. Cl.
CPC ................ *H04M 1/04* (2013.01); *H01F 7/02* (2013.01)

(58) Field of Classification Search
CPC .................................. H01F 7/02; H04M 1/04
See application file for complete search history.

(56) References Cited

U.S. PATENT DOCUMENTS

2011/0129249 A1* 6/2011 Koshimura .......... G03G 21/105
                                                                   399/99
2016/0105047 A1* 4/2016 Cui ....................... H02J 7/0044
                                                                   320/115
2017/0316856 A1* 11/2017 Shimauchi ................ B22F 9/04

OTHER PUBLICATIONS

International Search Report of PCT Patent Application No. PCT/CN2021/136910 issued on Mar. 2, 2022.

* cited by examiner

*Primary Examiner* — Shantell L Heiber
(74) *Attorney, Agent, or Firm* — Andrew C. Cheng

(57) ABSTRACT

A holder is configured to be detachably secured to an electronic device which includes a first magnetic attraction member. The holder includes a case and a second magnetic attraction member mounted to the case. The second magnetic attraction member is configured to be attracted to the first magnetic attraction member in a first direction. The second magnetic attraction member includes a first magnet layer extending along a circumferential direction; and a second magnet layer disposed around the first magnet layer in the circumferential direction, the first magnet layer and the second magnet layer being separately formed. The first magnet layer and the second magnet layer are polarized in an axial direction which is parallel to the first direction and perpendicular to the circumferential direction, and polarization directions of the first magnet layer and the second magnet layer are opposite to each other.

20 Claims, 19 Drawing Sheets

ELECTRONIC DEVICE HOLDER

FIELD

The invention relates to the technical field of accessories for electronic devices, and in particular, relates to an electronic device holder.

BACKGROUND

In recent years, mobile phones have become indispensable supplies for living and working in people's life. When in use, a mobile phone is usually only laid flat on a table, and when people want to watch a movie, they need to erect the mobile phone by holding it with hands so as to see the movie clearly, resulting inconvenience in use.

At present, there are some holders specially designed for mobile phones. However, these holders form a fixed connection with the mobile phones, which affects the overall appearance of the mobile phones and leads to redundancy in some occasions where the holders are not needed.

SUMMARY

To solve the above technical problems, the present disclosure provides an improved electronic device holder with steadiness in connection and convenience in use.

In one aspect, the present disclosure provides a holder configured to be detachably secured to an electronic device which comprises a first magnetic attraction member. The holder comprises a case configured to be secured to a mounting seat and a second magnetic attraction member mounted to the case and configured to be attracted to the first magnetic attraction member in a first direction. The second magnetic attraction member comprises a first magnet layer extending along a circumferential direction, and a second magnet layer disposed around the first magnet layer in the circumferential direction, the first magnet layer and the second magnet layer being separately formed. The first magnet layer and the second magnet layer are polarized in an axial direction which is parallel to the first direction and perpendicular to the circumferential direction, and polarization directions of the first magnet layer and the second magnet layer are opposite to each other.

In some embodiments, the second magnetic attraction member has a thickness of 2 mm to 4 mm in the axial direction.

In some embodiments, the first magnet layer has an inner diameter less than 46 mm and equal to or greater than 44 mm.

In some embodiments, the second magnet layer has outer diameter greater than 54.1 mm and equal to or less than 56.1 mm.

In some embodiments, the case comprises a base and a cover which cooperatively form an accommodation space for accommodating the second magnetic attraction member therein, and the base comprises a connecting portion formed at a side thereof opposite from the cover and configured to be secured to a mounting seat.

In some embodiments, the cover comprises a top plate, the base comprises a ring-shaped bottom wall with an inner peripheral edge and an outer peripheral edge, an inner circumferential sidewall extending from the inner peripheral edge, and an outer circumferential sidewall extending from the outer peripheral edge, the bottom wall, the inner circumferential side wall and the outer circumferential side walls cooperatively form an accommodating groove in which the second magnetic attraction member is received, and the cover covers an end, away from the bottom wall, of the second magnetic attraction member.

In some embodiments, the base further comprises an extension part extending from the outer circumferential sidewall thereof, and the connecting portion is formed on a side, away from the cover, of the extension part.

In some embodiments, the base comprises a plurality of reinforcing ribs formed at an opposite side thereof opposite from the connecting portion.

In some embodiments, the holder further comprises a charging coil mounted to the base, wherein the second magnetic attraction member surrounds the charging coil.

In some embodiments, the second magnetic attraction member has an open ring-shaped configuration with a notch formed between two ends thereof.

In some embodiments, the base comprises a body, the connecting portion and the second magnet layer are respectively located at opposite sides of the body, the body forms a receiving chamber, the base further comprises a ball-shaped joint connected to the connecting portion and received in the receiving chamber, and a cushion is disposed between the ball-shaped joint and an inner sidewall of the receiving chamber.

In some embodiments, the holder further comprises a mounting plate configured to mount the second magnetic attraction member to the case, wherein ends of the first magnet layer and the second magnet layer away from the electronic device are coaxially mounted to a side of the mounting plate. Preferably, the mounting plate is made of magnetic conductively material such as iron.

In some embodiments, the mounting plate has an outer diameter greater than or equal to that of the second magnet layer.

In some embodiments, the base comprises a body and a fixing plate, the mounting plate is secured to the body via the fixing plate, the mounting plate defines through holes, interlocking elements are respectively formed on the body and the fixing plate, the interlocking elements of one of the body and the fixing plate extend through corresponding through holes of the mounting plate to engage with the interlocking elements of the other of the body and the fixing plate.

In another aspect, the present disclosure provides a magnet assembly which comprises an annular first magnet layer extending in a circumferential direction, an annular second magnet layer disposed around the first magnet layer in the circumferential direction, and a mounting plate. The first magnet layer and the second magnet layer are separately formed and coaxially mounted to a side of the mounting plate. The mounting plate is made of magnetic conductively material. The first magnet layer and the second magnet layer are polarized in an axial direction which is perpendicular to the circumferential direction, and polarization directions of the first magnet layer and the second magnet layer are opposite to each other.

In some embodiments, the magnet assembly further comprises a case with an accommodating space, the first magnet layer and the second magnet layer are accommodated in the accommodating space.

In some embodiments, the case comprises a cover and a base, the mounting plate is secured to the base, and the first magnet layer and the second magnet layer are secured between the mounting plate and the cover.

In some embodiments, the cover comprises a top plate, the base comprises a ring-shaped bottom wall with an inner peripheral edge and an outer peripheral edge, an inner circumferential sidewall extending from the inner peripheral edge, and an outer circumferential sidewall extending from the outer peripheral edge, the bottom wall, the inner side wall and the outer side walls cooperatively form an accommodating groove in which the second magnetic attraction member is received, and the cover covers an end, away from the bottom wall, of the second magnetic attraction member, the mounting plate being secured to the bottom wall.

In some embodiments, the first magnet layer has an inner diameter less than 46 mm and equal to or greater than 44 mm.

In some embodiments, the second magnet layer has outer diameter greater than 54.1 mm and equal to or less than 56.1 mm.

In some embodiments, the mounting plate has an outer diameter greater than or equal to that of the second magnet layer.

In some embodiments, the mounting plate has an open ring-shaped configuration with a notch defined between two ends thereof.

In some embodiments, the mounting plate has a closed ring-shaped configuration.

In some embodiments, the mounting plate has a solid round configuration.

According to the electronic device holder provided in the above-mentioned embodiment, the electronic device holder is fixed via magnetic attraction onto an electronic device, the back face of which is provided with a second magnetic attraction member; the second magnetic attraction member is annular; a first magnetic attraction member comprises an annular inner magnet layer and an outer magnet layer disposed around the inner magnet layer; the inner magnet layer has an inner diameter smaller than that of the second magnetic attraction member; and the outer magnet layer has an outer diameter greater than that of the second magnetic attraction member. When the electronic device holder is fixed via attraction onto the back face of the electronic device, both the inner magnet layer and the outer magnet layer are at least partially mutually overlapped with the second magnetic attraction member. In the electronic device holder, the inner magnet layer and the outer magnet layer are arranged in an overlapped manner, and the inner magnet layer and the outer magnet layer are respectively connected via attraction to the second magnetic attraction member of the electronic device, such that the electronic device holder is stably mounted on the electronic device to achieve a holder function, and can be conveniently detached from the electronic device in an occasion where the holder is not needed.

DESCRIPTION OF THE EMBODIMENTS

The following further sets forth the technical solutions of the invention in detail in conjunction with the accompanying drawings of the description and the specific embodiments. Unless otherwise defined, all technical and scientific terms used herein have the same meanings as those commonly understood by those skilled in the technical field of the invention. The terms used herein in the description of the invention are merely for the purpose of describing specific embodiments, and are not intended to limit the invention. The expression of "some embodiments" involved in the description below describes a subset of all possible embodiments, but it should be understood that "some embodiments" may represent the subset the same as or different from all possible embodiments, and may be combined with each other in the absence of conflicts.

It should be additionally noted that when an element is referred to as being "fixed to" another element, the element can be disposed on said another element directly or possibly with an intermediate element located therebetween. When an element is referred to as being "connected to" another element, the element can be connected to said another element directly or possibly simultaneously with an intermediate element located therebetween. The terms "vertical", "horizontal", "inner", "outer", "left", "right" and similar expressions used herein are for an illustrative purpose rather than representing the unique embodiment.

Figure 1:
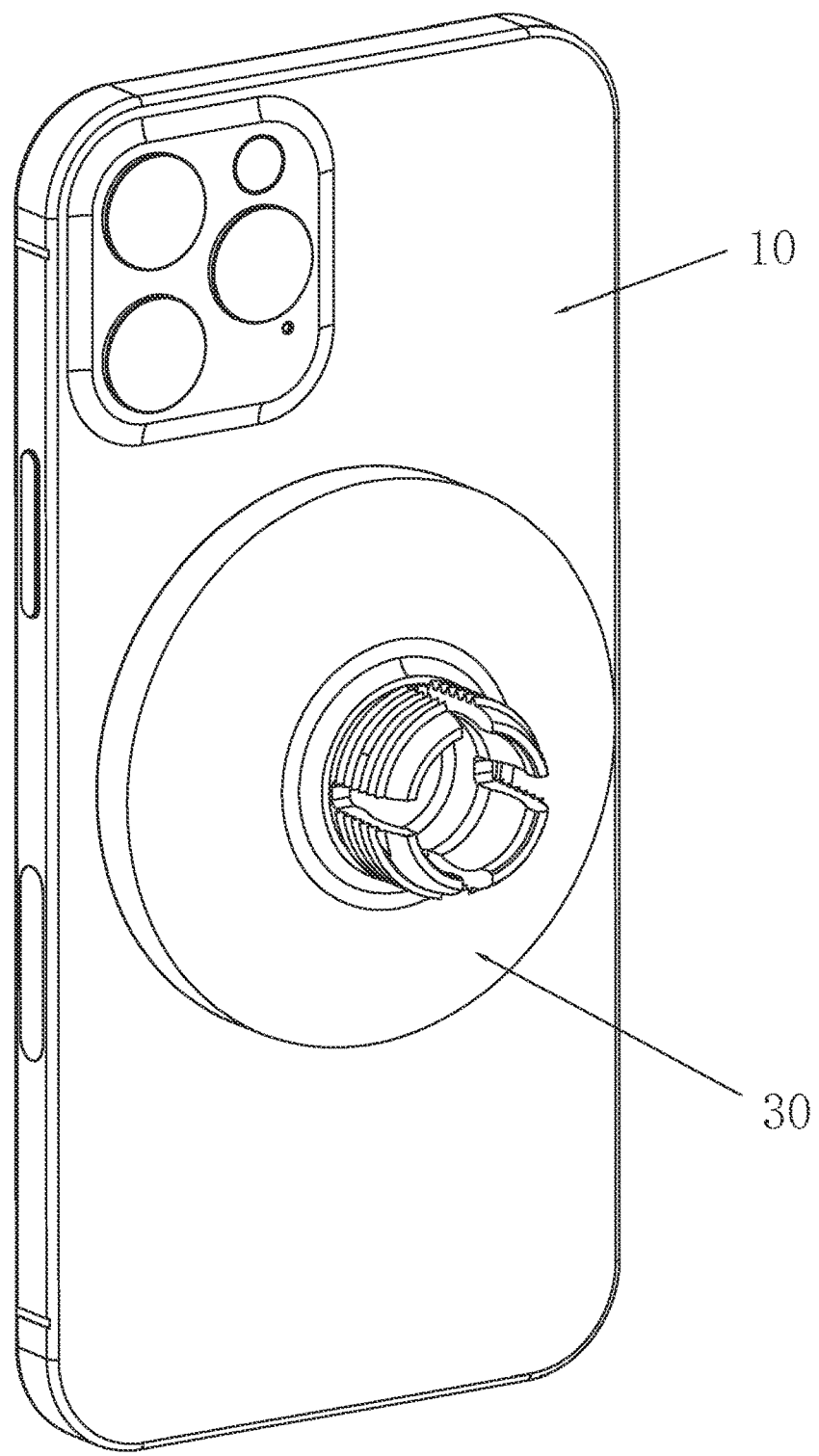
FIG. 1 illustrates an electronic device holder mounted to an electronic device according to a first embodiment of the present application.
Figure 2:
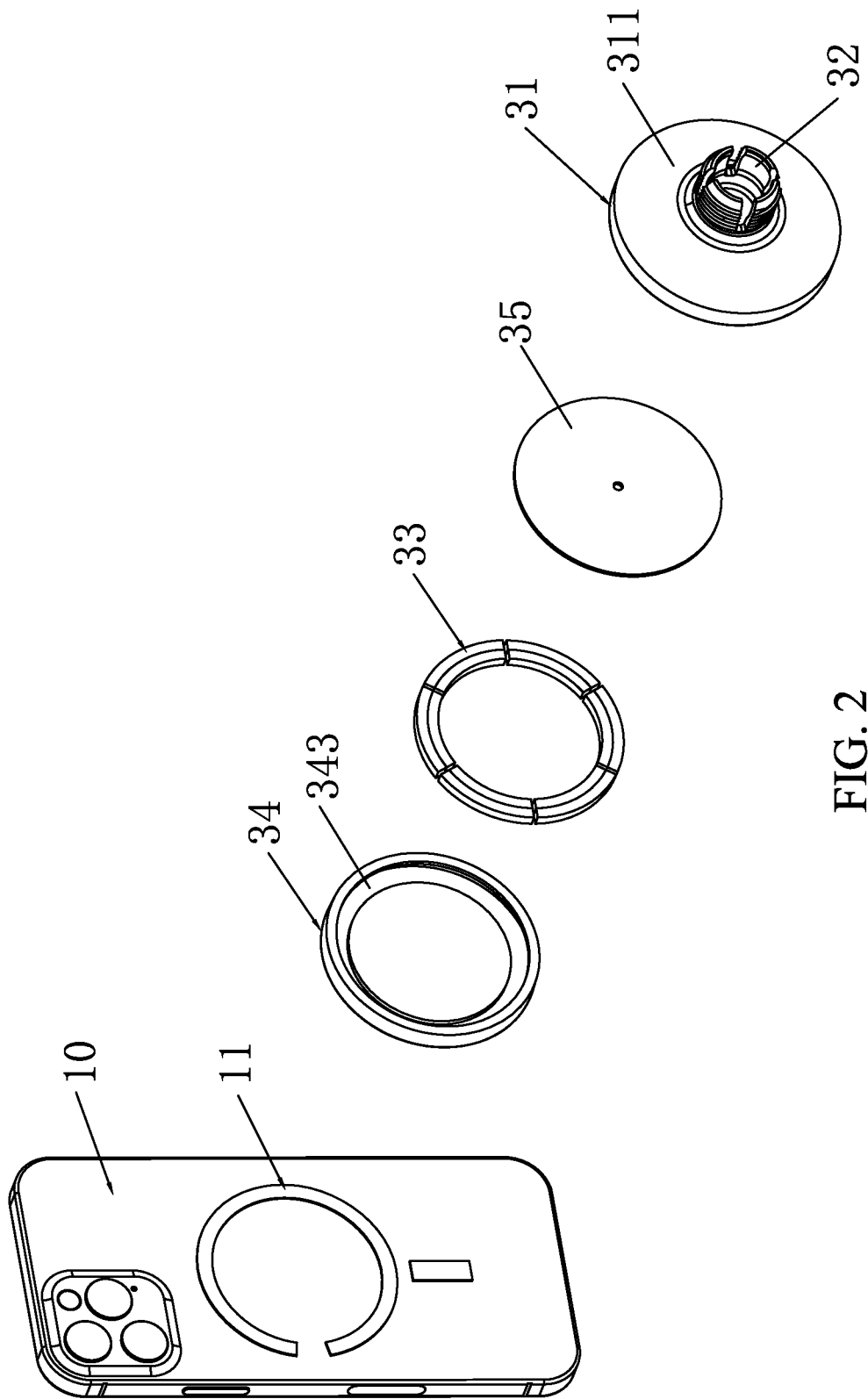
FIG. 2 is an exploded view of FIG. 1.

Referring to FIG. 1 and FIG. 2, an embodiment of the present application provides an electronic device holder 30, which is configured to be detachably connected onto a housing 10 of an electronic device in a magnetic attraction manner. The housing 10 is provided with a first magnetic attraction member 11. The electronic device holder 30 includes a second magnetic attraction member 33. The electronic device holder 30 is fixed onto the electronic device by a magnetic attracting force formed between the second magnetic attraction member 33 and the first magnetic attraction member 11. The electronic device holder 30 may be the electronic device holder 30 described in any embodiment of the present application, with the details introduced as follows.

Figure 3:
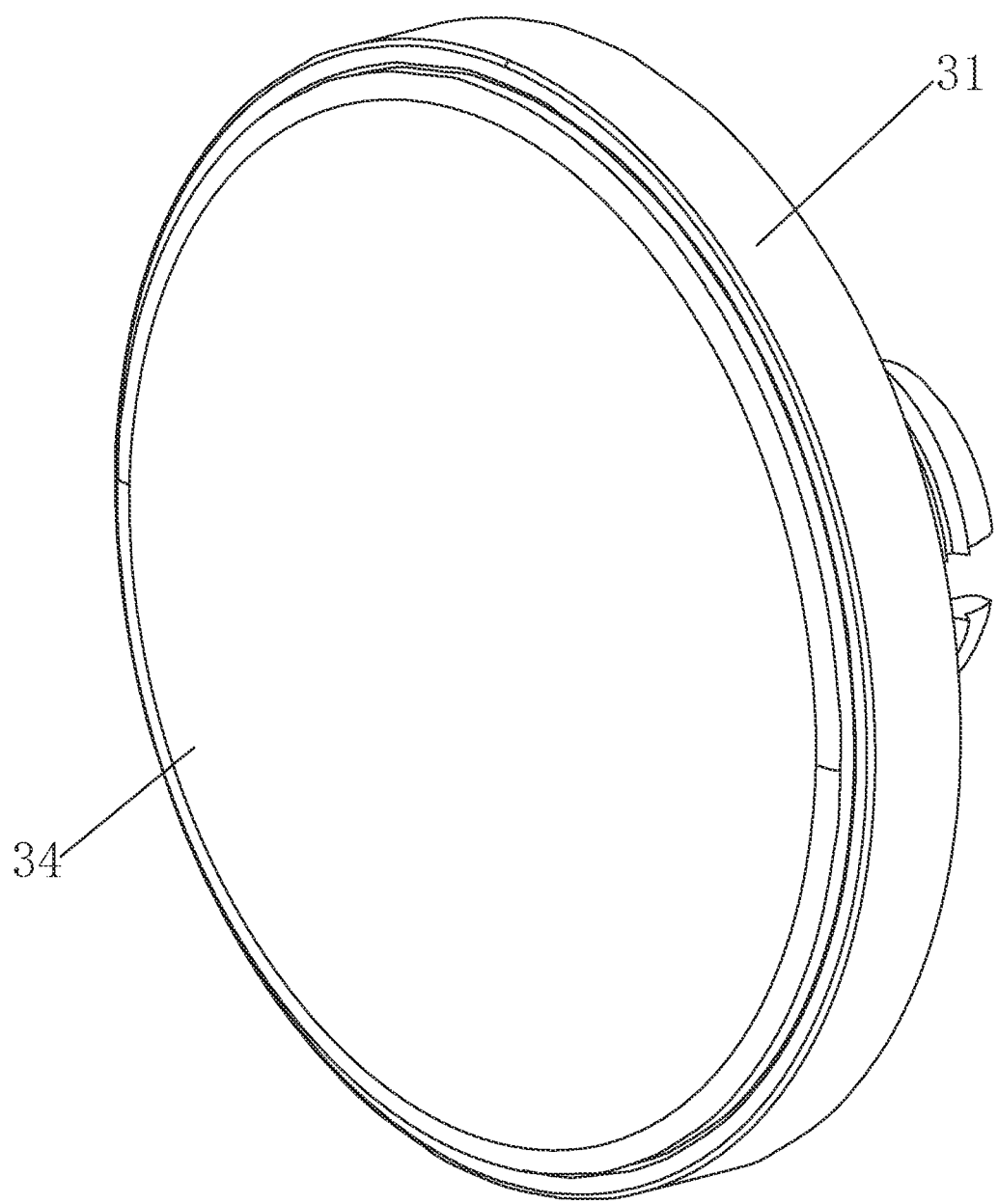
FIG. 3 is a perspective view of an electronic device holder according to a second embodiment of the present application.
Figure 4:
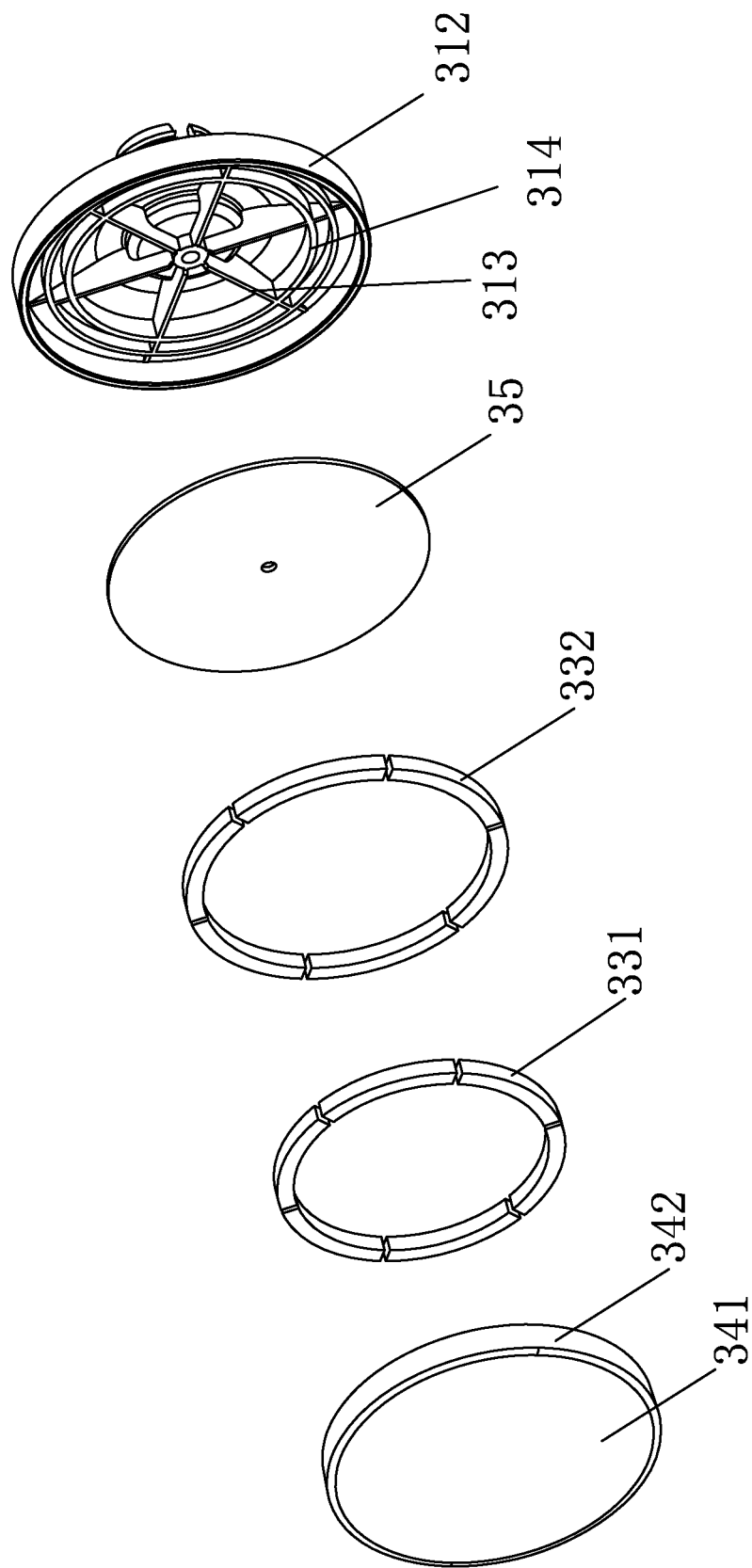
FIG. 4 is an exploded view of the electronic device holder in FIG. 3.

Referring to FIG. 3 and FIG. 4, according to another aspect of the embodiment of the present application, an electronic device holder 30 is further provided. The electronic device holder 30 includes a case and a second magnetic attraction member 33 mounted in the case. Specifically, the case comprises a base 31, a connecting portion 32 disposed at one side of the base 31, and the second magnetic attraction member 33 disposed on the other side of the base 31. The electronic device holder 30 is configured to be fixed, by means of magnetic attraction, onto an electronic device, the back face of which is provided with a first magnetic attraction member 11. The first magnetic attraction member 11 is annular. The second magnetic attraction member 33 includes an annular first magnet layer 331 and an annular second magnet layer 332 around the first magnet layer 331. In this embodiment, the first magnet layer 331 is called as inner magnet layer 331 and the second magnet layer 332 is called as outer magnet layer 332. The inner magnet layer 331 has an inner diameter smaller than that of the first magnetic attraction member 11, and the outer magnet layer 332 has an outer diameter greater than that of the first magnetic attraction member 11.

In the above-mentioned embodiment, the housing 10 of the electronic device is internally provided with the first magnetic attraction member 11. In the electronic device holder 30, the inner magnet layer 331 and the outer magnet layer 332 are arranged in an overlapped manner in a radial direction, and the inner magnet layer 331 and the outer magnet layer 332 are respectively attracted with the first magnetic attraction member 11 of the electronic device, such that the electronic device holder 30 is stably mounted on the electronic device to achieve a holder function, and can be conveniently detached from the electronic device in an occasion where the holder is not needed, so the appearance of the electronic device will not be affected.

Figure 5A:
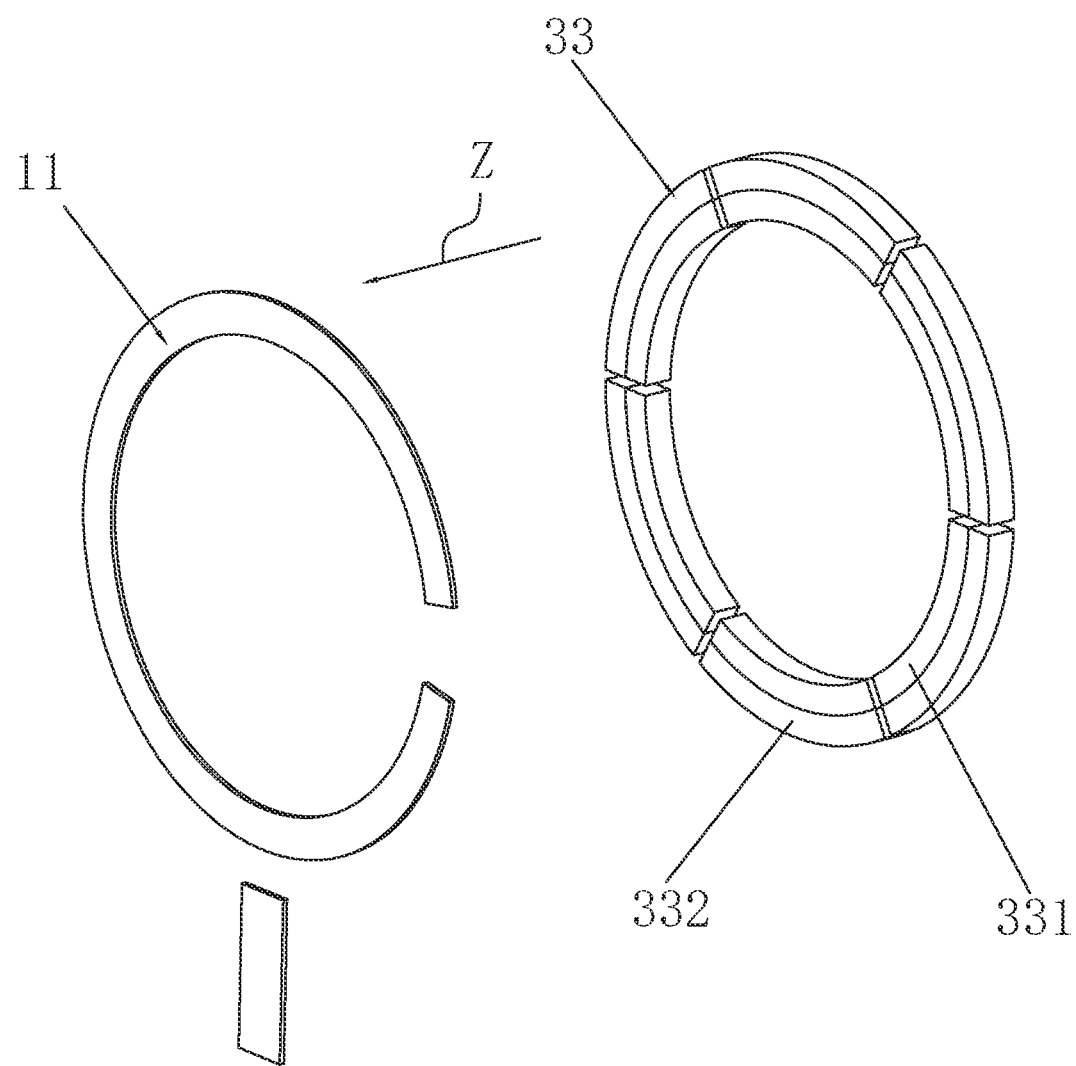
FIG. 5A is a perspective view of a first magnetic attraction member and a second magnetic attraction member according to an embodiment of the present application.
Figure 6:
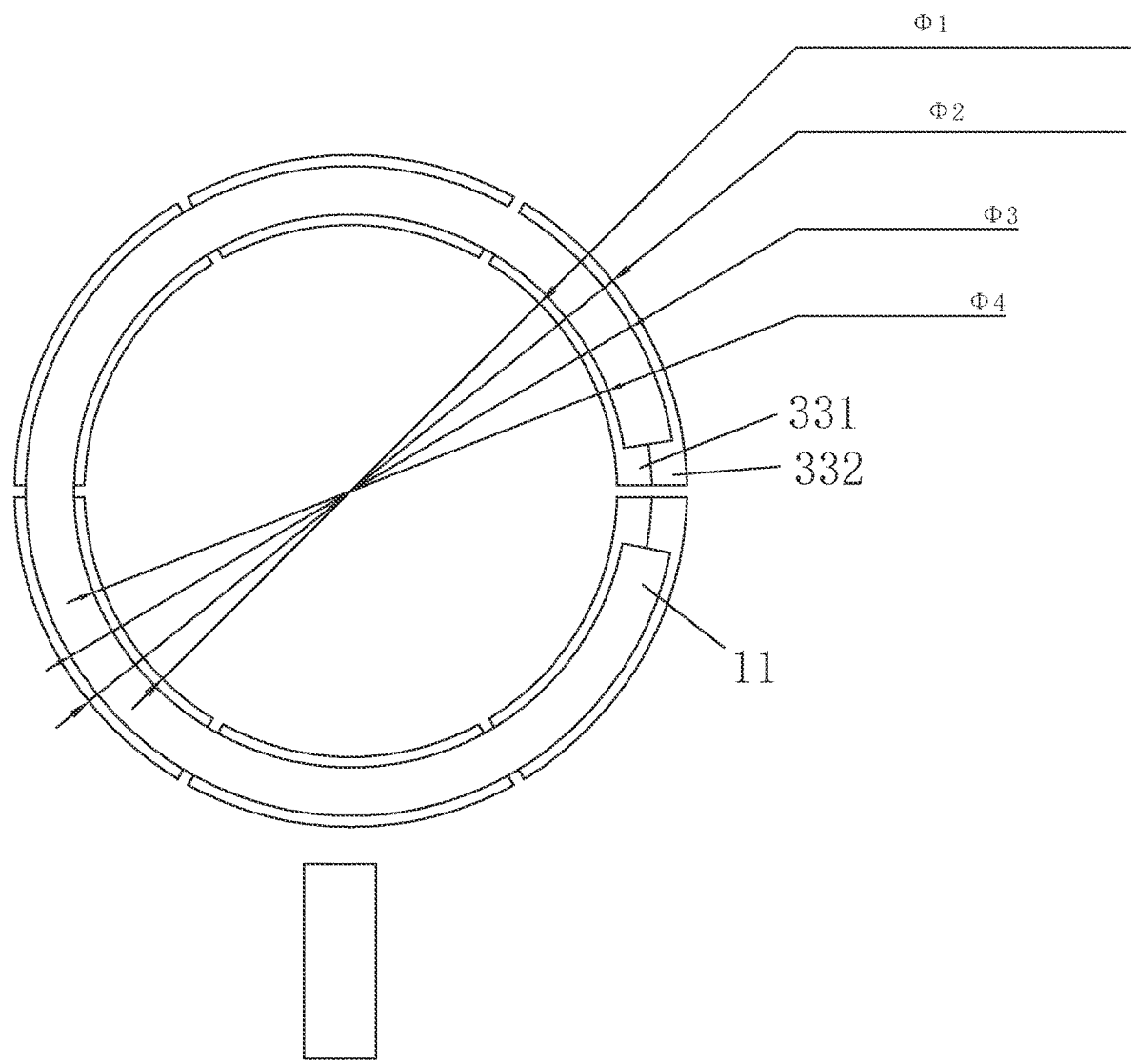
FIG. 6 is a sectional view of a first magnetic attraction member and a second magnetic attraction member according to an embodiment of the present application.

Optionally, as shown in FIG. 5A and FIG. 6, the inner magnet layer 331 includes a plurality of first segment magnets which are distributed in the shape of an annular ring. Adjacent first segment magnets may contact with each other or are arranged at interval. The outer magnet layer 332 includes a plurality of second segment magnets which are distributed in the shape of an annular ring. Adjacent second segment magnets may contact with each other or are arranged at interval. The number of the first segment magnets is the same as that of the second segment magnets, for example, each of the first magnet layer 331 and the second magnet layer 332 comprising six arcuate segment magnets. The second magnetic attraction member 33 is in the shape of an annular ring as a whole. The inner magnet layer 331 consists of a plurality of separately formed arcuate first segment magnets which are arranged along a circumferential direction and joined together to form a closed annular ring. The outer magnet layer 332 consists of a plurality of separately formed arcuate second segment magnets which are arranged along the circumferential direction and joined together to form a closed annular ring. The outer magnet layer 332 has an inner diameter equal to or greater than the outer diameter of the inner magnet layer 331. The first segment magnets and the corresponding second segment magnets are respectively stacked with each other in a radial direction to cooperatively form the second magnetic attraction member 33. In some other embodiments, the inner magnet layer 331 and the outer magnet layer 332 may also be formed in the shape of an integral ring magnet, respectively.

Optionally, the first magnetic attraction member 11 is in the shape of an annular ring notched at one side. The first magnetic attraction member 11 is made of a magnet conductive material, such as iron or permanent magnet, capable of attracting the second magnetic attraction member 33 with each other. The first magnetic attraction member 11 is in the shape of an annular ring, with an outer diameter smaller than that of the second magnetic attraction member 33 and an inner diameter greater than that of the second magnetic attraction member 33. When the electronic device holder 30 is fixed via magnetic attraction onto the electronic device, the first magnetic attraction member 11 and the second magnetic attraction member 33 are coincident in the central axis and the first magnetic attraction member 11 is overlapped with the middle portion of the second magnetic attraction member 33, such that a more stable and reliable connection can be achieved. In some embodiments, the diameter of the inner surface of the inner magnet layer 331 is defined as a first inner diameter $\Phi1$; the diameter of the outer surface of the outer magnet layer 332 is defined as a first outer diameter $\Phi2$; the diameter of the inner surface the first magnetic attraction member 11 is defined as a second inner diameter $\Phi4$; and the diameter of the outer surface of the second magnetic attraction member is defined as a second outer diameter $\Phi3$. The first inner diameter $\Phi1$ is greater than or equal to 44 mm and smaller than 46 mm; and the first outer diameter $\Phi2$ is greater than 54.1 mm and smaller than or equal to 56.1 mm. The second inner diameter $\Phi4$ is 46 mm, and the second outer diameter $\Phi3$ is 54.1 mm. When the electronic device holder 30 is fixed via magnetic attraction onto the electronic device, the first magnetic attraction member 11 is located at a position corresponding to a joint area where the inner magnet layer 331 and the outer magnet layer 332 are connected with each other. An inner layer portion, relatively close to the central axis, of the first magnetic attraction member 11 is partially coincident with the inner magnet layer 331 axially, and an outer layer portion, relatively away from the central axis, of the first magnetic attraction member 11 is partially coincident with the outer magnet layer 332 axially. Optionally, a difference value between the first outer diameter $\Phi2$ and the second outer diameter $\Phi3$ is equal to a difference value between the second inner diameter 14 and the first inner diameter $\Phi1$, such that, when the second magnetic attraction member 33 and the first magnetic attraction member 11 are connected via magnetic attraction, the central axis of the second magnetic attraction member 33 and the first magnetic attraction member 11 are coincident and the second magnetic attraction member 33 and the first magnetic attraction member 11 are connected reliably.

Figure 7:
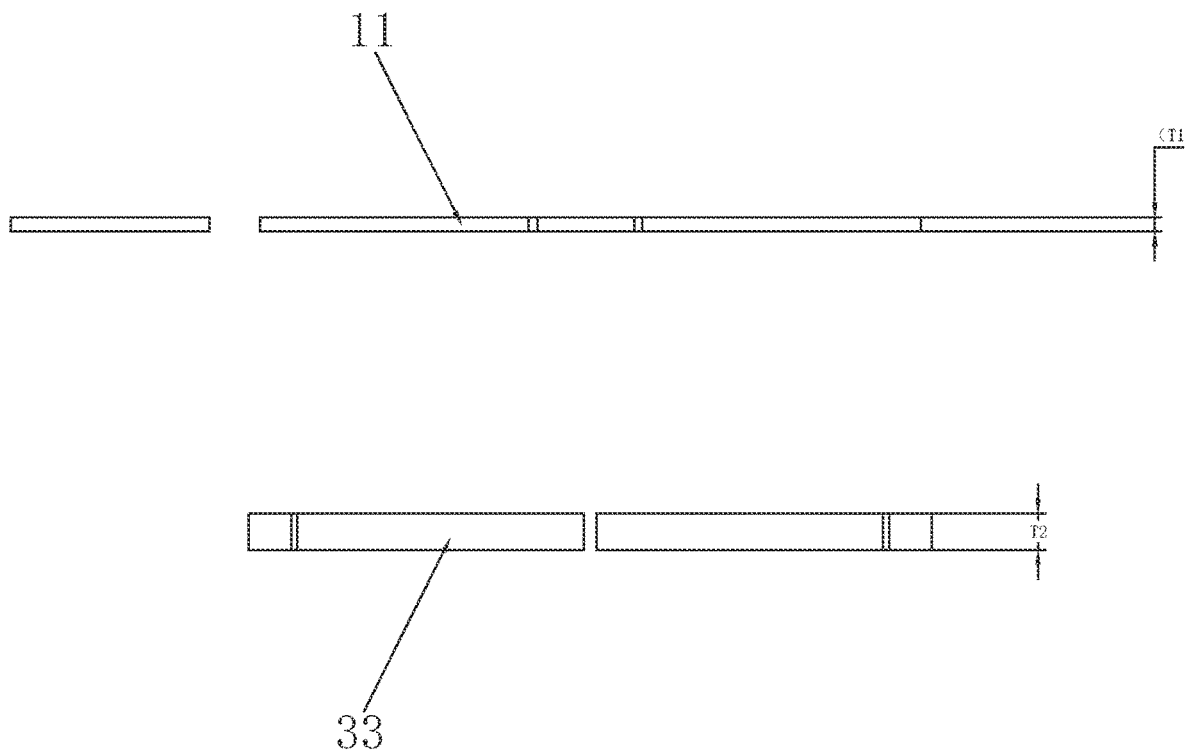
FIG. 7 is a side view of a first magnetic attraction member and a second magnetic attraction member according to an embodiment of the present application.

Optionally, as shown in FIG. 7, the second magnetic attraction member 33 has a thickness in an axial direction ranging from 2 mm to 4 mm. The thickness of the first magnetic attraction member 11 is smaller than that of the second magnetic attraction member 33. The thickness of the second magnetic attraction member 33 is represented as T2, and the thickness of the first magnetic attraction member 11 is represented as T1. The thickness of the inner magnet layer 331 is equal to the thickness of the outer magnet layer 332. That is to say, the thickness of the first magnet is equal to that of the second magnet. The first magnetic attraction member 11 is designed to be thin, such that the thickness and weight of the housing 10 of the electronic device will not be increased. The thickness T2 of the second magnetic attraction member 33 is between 2 mm and 4 mm, so as to ensure that the second magnetic attraction member 33 provides an enough large magnetic attraction force for achieving stable attraction and connection with the first magnetic attraction member 11. The first magnetic attraction member 11 can be made of permanent magnet such as rare earth permanent magnet or ferrite magnet. Alternatively, the first magnetic attraction member 11 can be made of a magnet conductive material such as iron. The second magnetic attraction member 33 can be made of permanent magnet such as rare earth permanent magnet or ferrite magnet. Preferably, the first magnet layer 331 and the second magnet layer 332 are made of the same material and have the same axial thickness and radial width. Alternatively, the first magnet layer 331 and the second magnet layer 332 are made of different material and have different axial thickness and radial width. For example, one of the first magnet layer 331 and the second magnet layer 332 made of rare earth permanent magnet has a thickness/width less than the other of the first magnet layer 331 and the second magnet layer 332 made of ferrite permanent magnet.

Figure 5B:
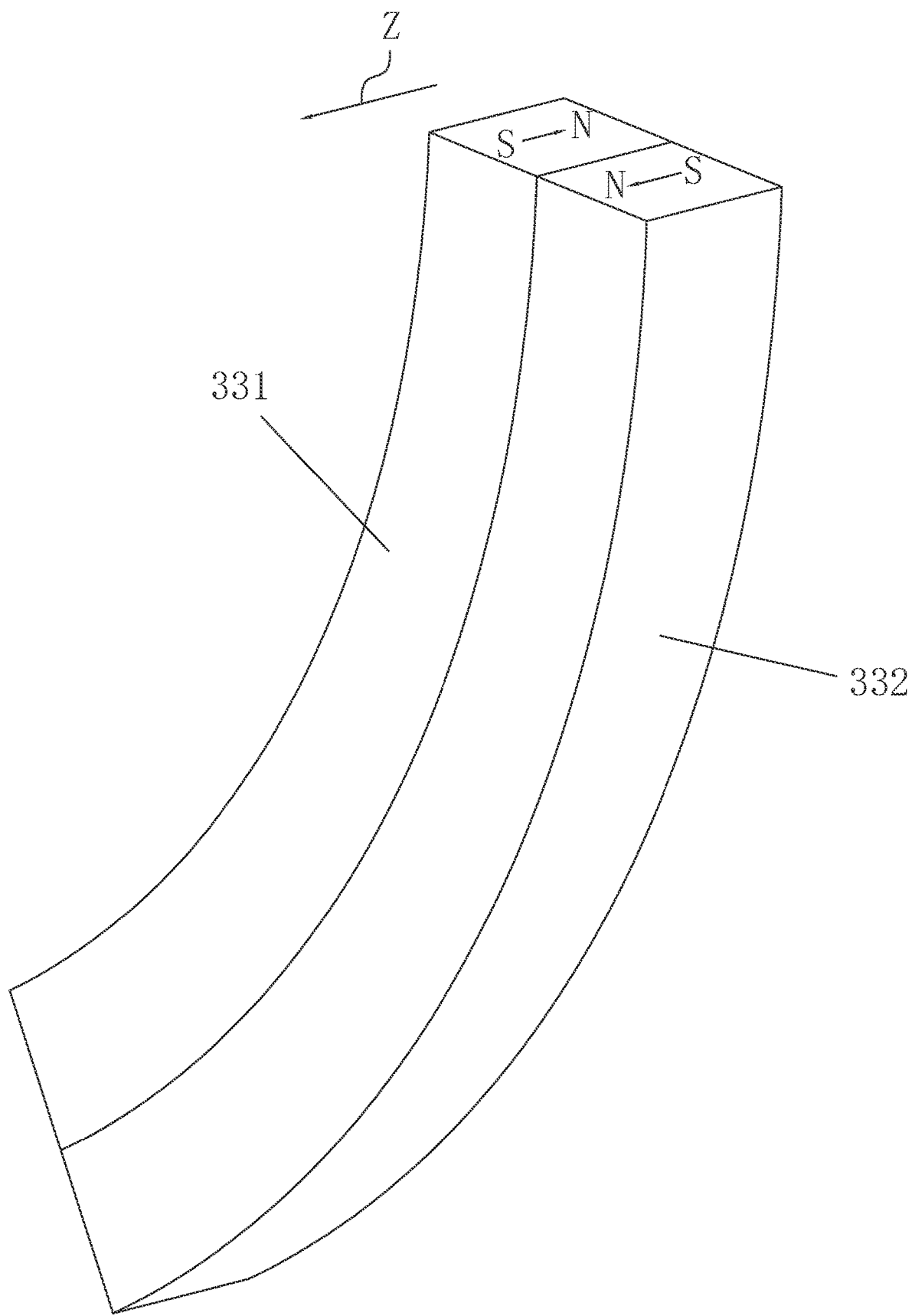
FIG. 5B illustrates a section of the second magnetic attraction member, showing the second magnetic attraction member being polarized in an axial direction thereof and polarization directions of the first magnet layer and the second magnet layer of the second magnetic attraction member being opposite to each other.

The electronic device holder 30 can be fixed to the electronic device in a first direction Z. In some embodiments, the first magnet layer 331 and the second magnet layer 332 are polarized in an axial direction thereof which is parallel to the first direction Z and perpendicular to the circumferential direction thereof, and polarization directions of the first magnet layer 331 and the second magnet layer 332 are opposite to each other, as shown in FIG. 5B. The polarized direction of the first magnet layer 331 and the second magnet layer 332 is perpendicular to the surface of the mounting plate 35 on which the first magnet layer 331 and the second magnet layer 332 are mounted.

In some embodiments, the electronic device holder 30 further includes a cover 34, and the cover 34 and the base 361 cooperatively form an accommodation space for accommodating the second magnetic attraction member 33 therein. The cover 34 and the base 31 cooperatively form an accommodation space to accommodate the second magnetic attraction member 33 therein, such that the electronic device holder 30 is simple in structure, easy to assemble and concise in overall appearance. The cover 34 includes a top plate 341 and a side plate 342 extending from the peripheral edge of the top plate 341 towards the base 31. The top plate 341 is provided, at a position close to the side plate 342, with a mounting groove 343 matching the second magnetic attraction member 33 in shape. The base 31 includes a bottom wall 311 and a side wall 312 extending from the bottom wall 311 towards the cover 34. An end of the second magnetic attraction member 33 away from the bottom wall 311 is secured in the mounting groove 343, and the inner surface of the side wall 312 of the base 31 is in firmly contact with the outer surface of the side plate 342 of the cover 34. The inner diameter of the side plate 342 is approximately equal to the outer diameter of the second magnetic attraction member 33. The mounting groove 343 is formed in at the joint of the top plate 341 and the side plate 342. The width of the mounting groove 343 is approximately equal to the width of an entirety formed by stacking the inner magnet layer 331 and the outer magnet layer 332, and the axial depth of the mounting groove 343 is smaller than or equal to the axial thickness of the second magnetic attraction member 33, whereby, during assembly, the second magnetic attraction member 33 can be first inserted into the mounting groove 343 of the cover 34, and the side plate 342 of the cover 34 is then inserted along the inner surface of the side wall 312 of the base 31, such that the cover 34 and the base 31 can form a close-fit/interference-fit connection therebetween, or the side plate 342 and the side wall 312 can be connected by means of a coated bonding material. Thus, the assembly is simple and convenient. The second magnetic attraction member 33 is further provided, at a side away from the top plate 341, with a mounting plate, for example, a disc-shaped iron sheet 35, the diameter of which is approximately equal to the outer diameter of the second magnetic attraction member 33. After the cover 34 and the base 31 are assembled, the iron sheet 35 and the top plate 341 are respectively tightly butted against the end faces of two opposite ends of the second magnetic attraction member 33, which can avoid looseness of the second magnetic attraction member 33. The mounting plate is made of magnet conductive material and thus allows the second magnetic attraction member 33 to be assembled thereto before the second magnetic attraction member 33 is inserted to the mounting groove 343. In addition, the mounting plate allows magnet flux emitted from one of the inner magnet layer 331 and the outer magnet layer 332 to return back to the other of the inner magnet layer 331 and the outer magnet layer 332.

In some embodiments, the connecting portion 32 is a connecting sleeve extending outwards from a side of the bottom wall 311 away from the cover 34, and the connecting sleeve is provided with a threaded structure at an outer surface thereof. In use, the electronic device holder 30 is fixed via magnetic attraction behind the back face of the electronic device, and then the electronic device together with the holder 30 is fixed to a required specified position by means of the connecting portion 32, such that the electronic device can be used in a hands-free way. It should be noted that the connecting portion 32 is not limited to the connecting sleeve described in this embodiment, and may also have another structure capable of allowing the electronic device to be erected laterally or fixing the electronic device onto the required specified position. Optionally, the bottom wall 311 is provided, on a side facing the cover 34, with first reinforcing ribs 313 radially extending outwards from a center thereof and second annular reinforcing ribs 314 connected among the first reinforcing ribs 313. The first reinforcing ribs 313 and the second reinforcing ribs 314 may strengthen the overall structural strength of the base 31.

Figure 8:
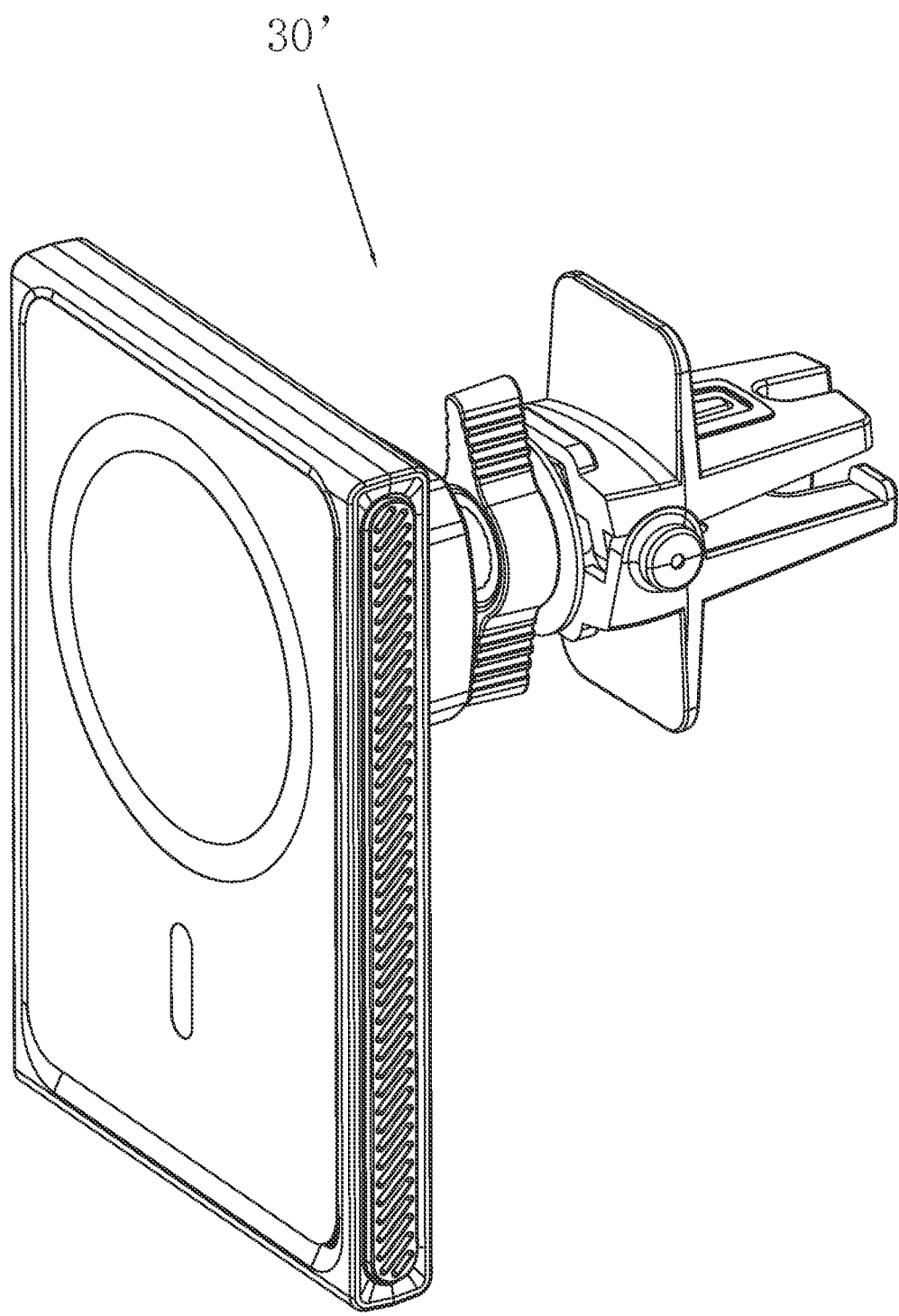
FIG. 8-10 illustrate an electronic device holder according to a third embodiment of the present application.
Figure 9:
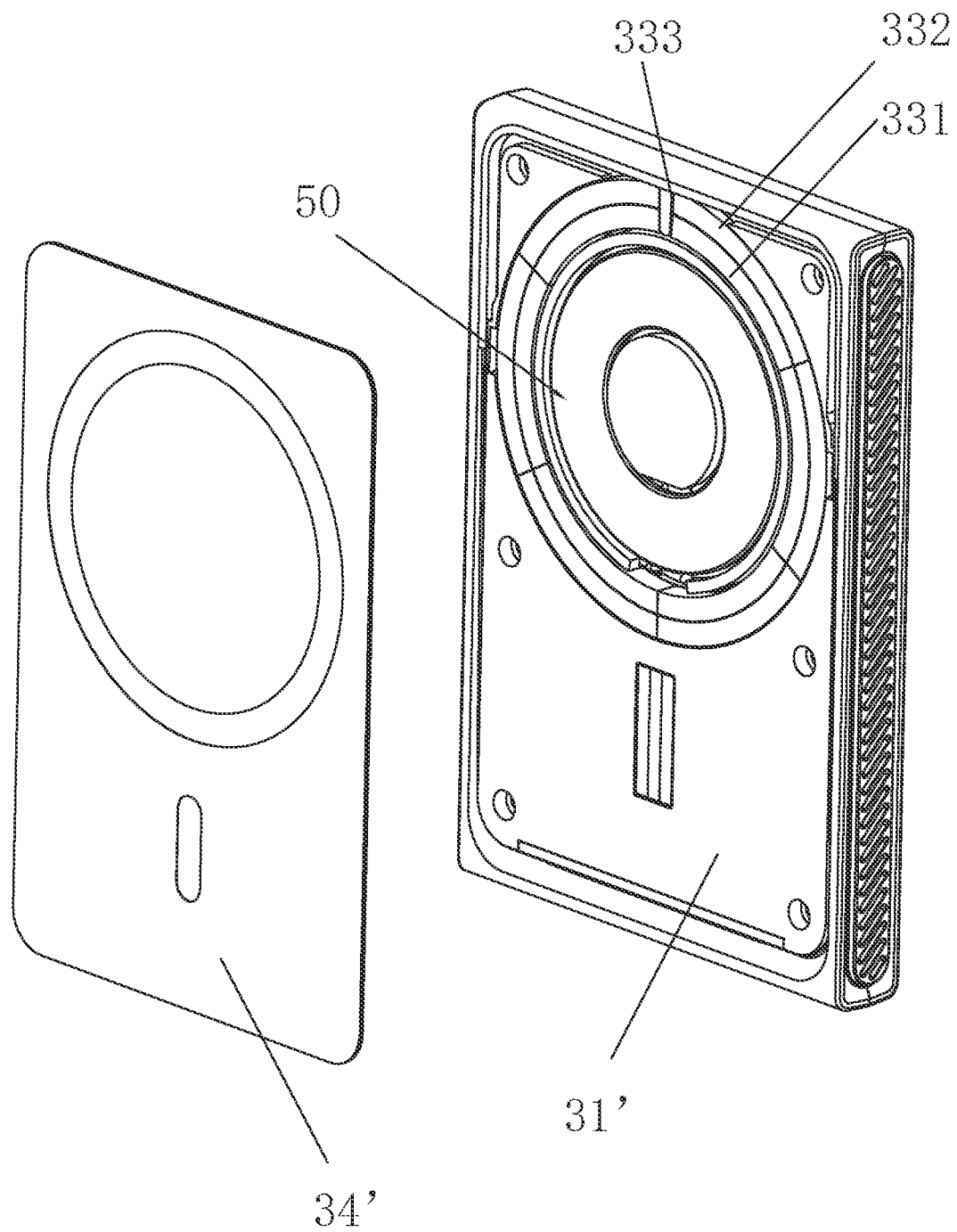
Figure 10:
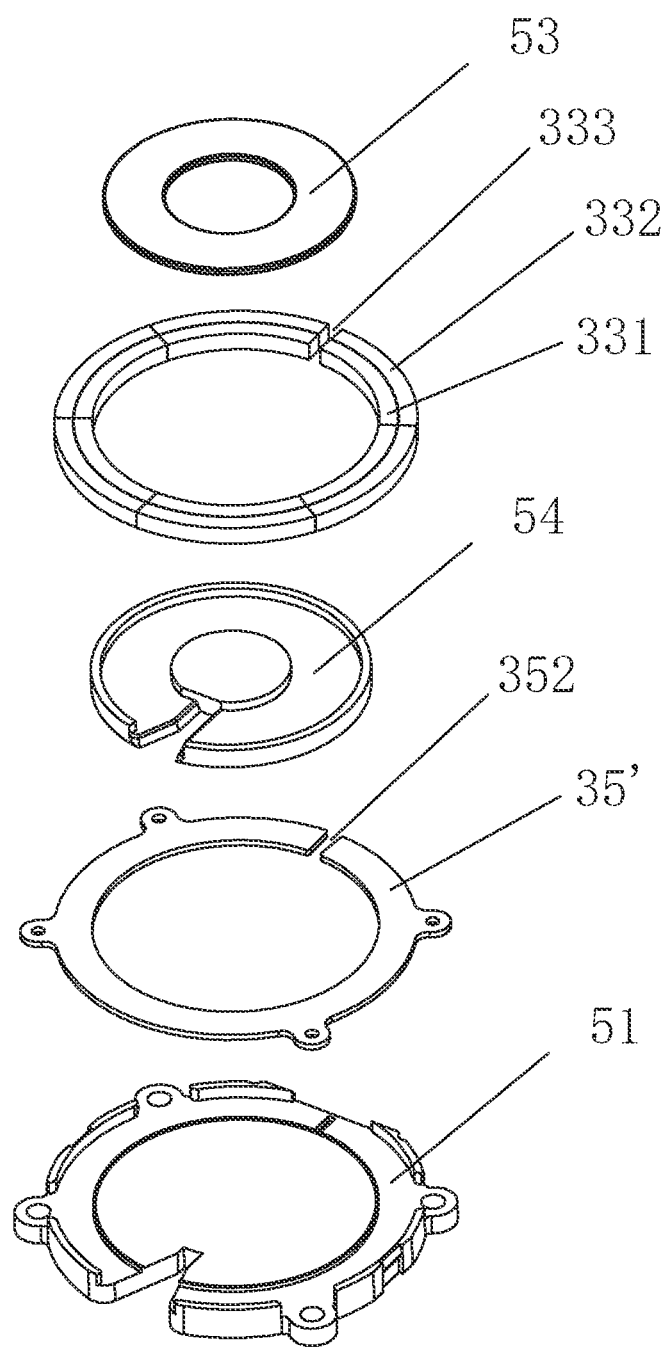

Referring to FIGS. 8-10 in some embodiments, the electronic device holder 30' further includes a wireless charging module 50 which includes a circuit board and a charging coil 53 disposed on an upper surface of the circuit board. The inner magnet layer 331 surrounds the periphery of the charging coil 53, and the charging coil 53 is electrically connected to the circuit board 42, such that, after the electronic device holder 30 is connected to an external power supply, an electronic device having a wireless charging function is wirelessly charged by means of the wireless charging module.

Specifically, the wireless charging module 50 further comprises a tray 51 configured to mount the wireless charging module 50 to the base 31' of the electronic device holder 30', a yoke 54 configured to mount the charging coil 53 thereon and to return magnet flux to the charging coil 53. The inner magnet layer 331 and the outer magnet layer 332 are mounted on the mounting plate 35' which can be fixed to the tray 51. The mounting plate 35' defines a notch 352 to form an open ring-shaped configuration. Accordingly, the second magnetic attraction member 33 has an open ring-shaped configuration with a notch 333 formed between two ends thereof. The notch 333 extends through the first and second magnet layers 331/332 to separate two ends the first/second magnet layers 331/332 respectively. Preferably, the notch 352 is aligned with the notch 333 axially. The notches 352/333 formed in the mounting plate 35' and the second magnetic attraction member 33 are configured to avoid a current loop being generated in the mounting plate 35' or the second magnetic attraction member 33 when the charging coil 53 is electrified.

In use, when the electronic device holder 30' is close to an electronic device, the electronic device holder 30' is attracted to the housing 10 of the electronic device by a magnetic attracting force formed between the second magnetic attraction member 33 located in the electronic device holder 30' and the first magnetic attraction member 11 located in the electronic device. The charging coil 53 is electrified by an external power source via the circuit board and thus generates a changing electromagnetic filed that results in a current being generated in a coil located in the electronic device to thereby charge the electronic device.

Figure 11:
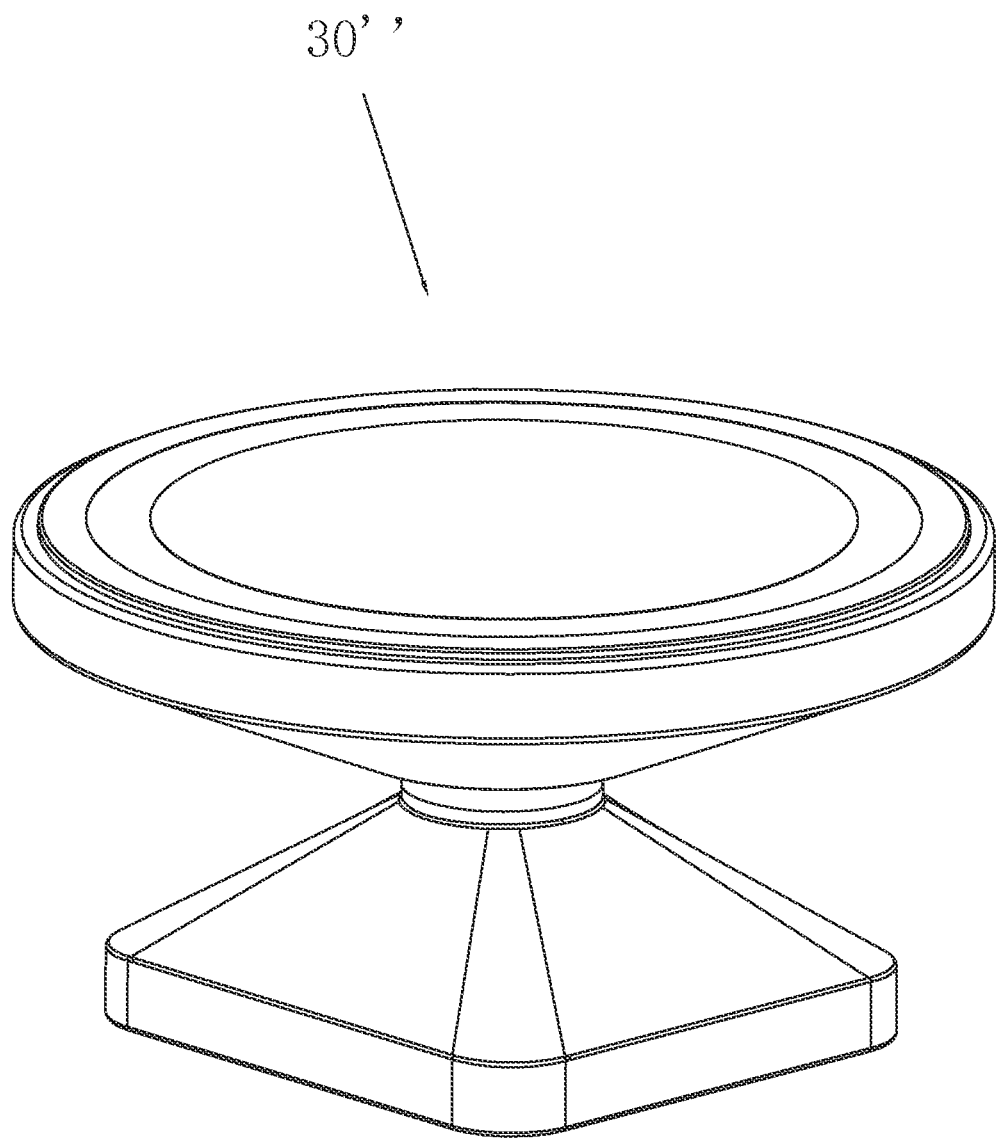
FIG. 11-13 illustrate an electronic device holder according to a fourth embodiment of the present application.
Figure 12:
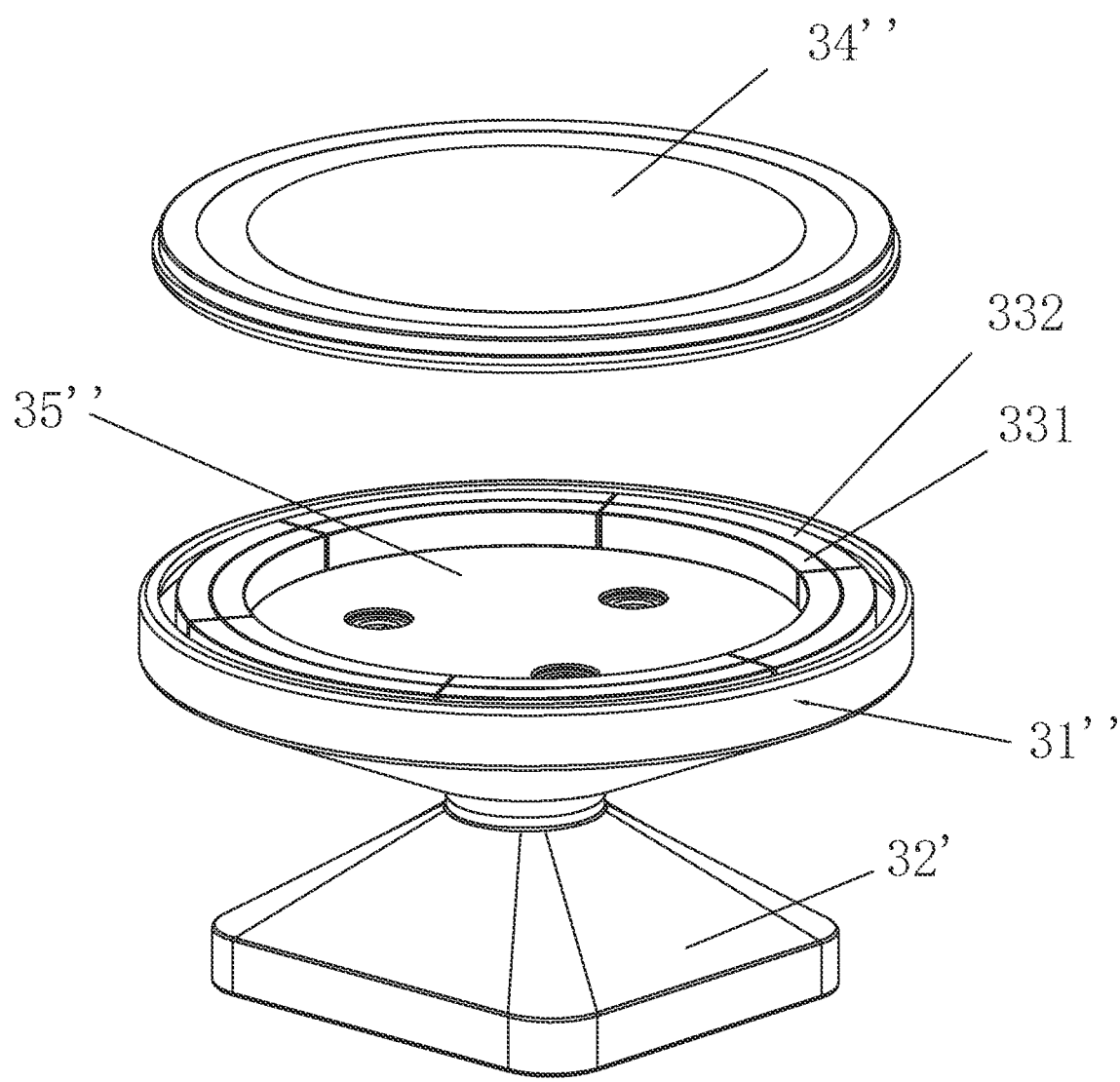
Figure 13:
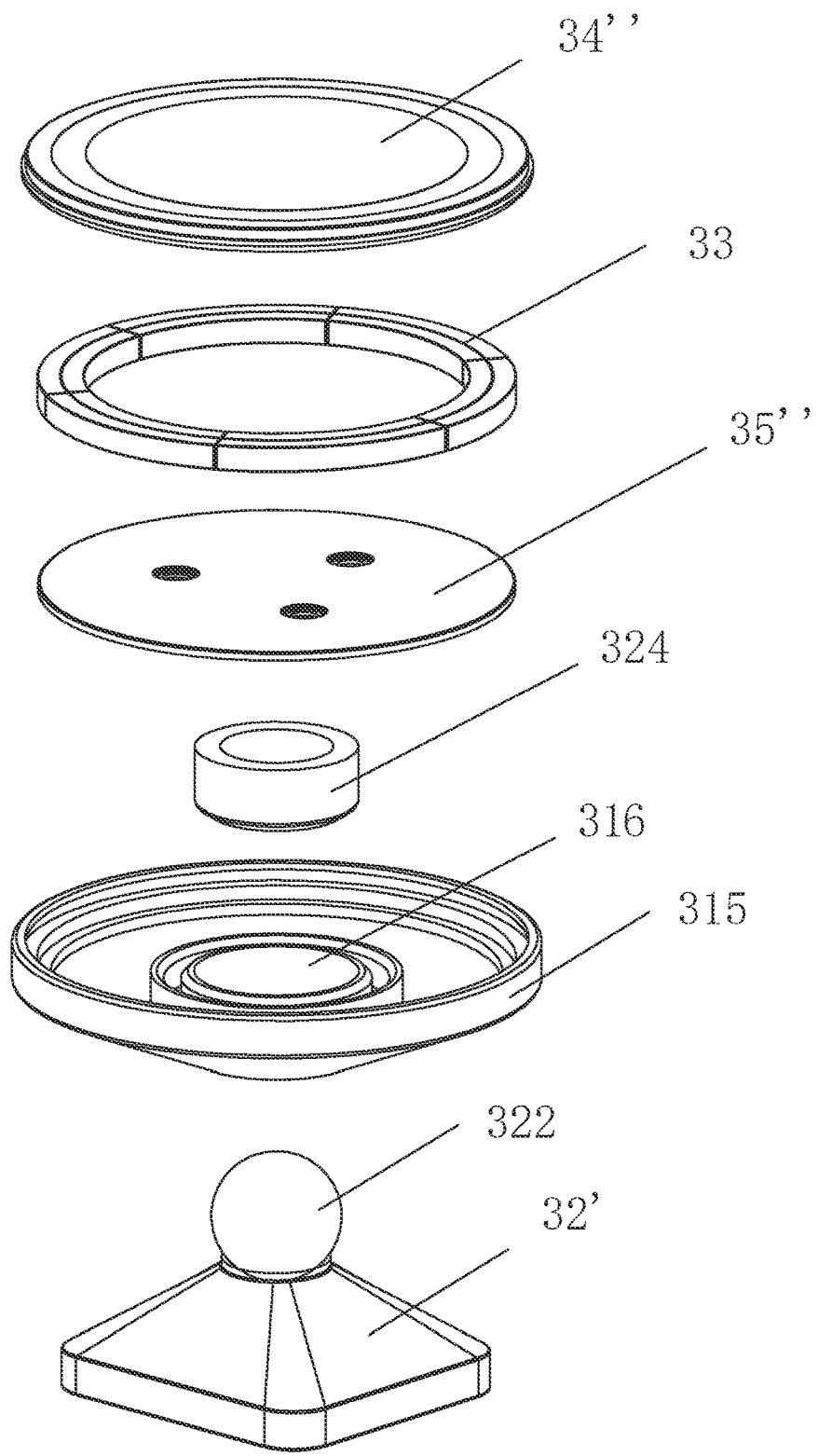

Referring to FIGS. 11-13, in some embodiments, the base 31" of the electronic device holder 30" comprises a body 315, the connecting portion 32' and the second magnetic attraction member 33 are respectively located at opposite sides of the body 315. The body 315 forms a receiving chamber 316. The connecting portion 32' comprises a ball-shaped joint 322 received in the receiving chamber 316, and a cushion 324 is disposed between the ball-shaped joint 322 and an inner sidewall of the receiving chamber 316. Preferably, the cushion 324 is of a ring structure made of rubber or silicone. The mounting plate 35" and the first and second magnet layers 331/332 are accommodated in an accommodating space of the body 315. The cover 34" is attached to the body 315 and covers the mounting plate 35" and the first and second magnet layers 331/332.

Figure 14:
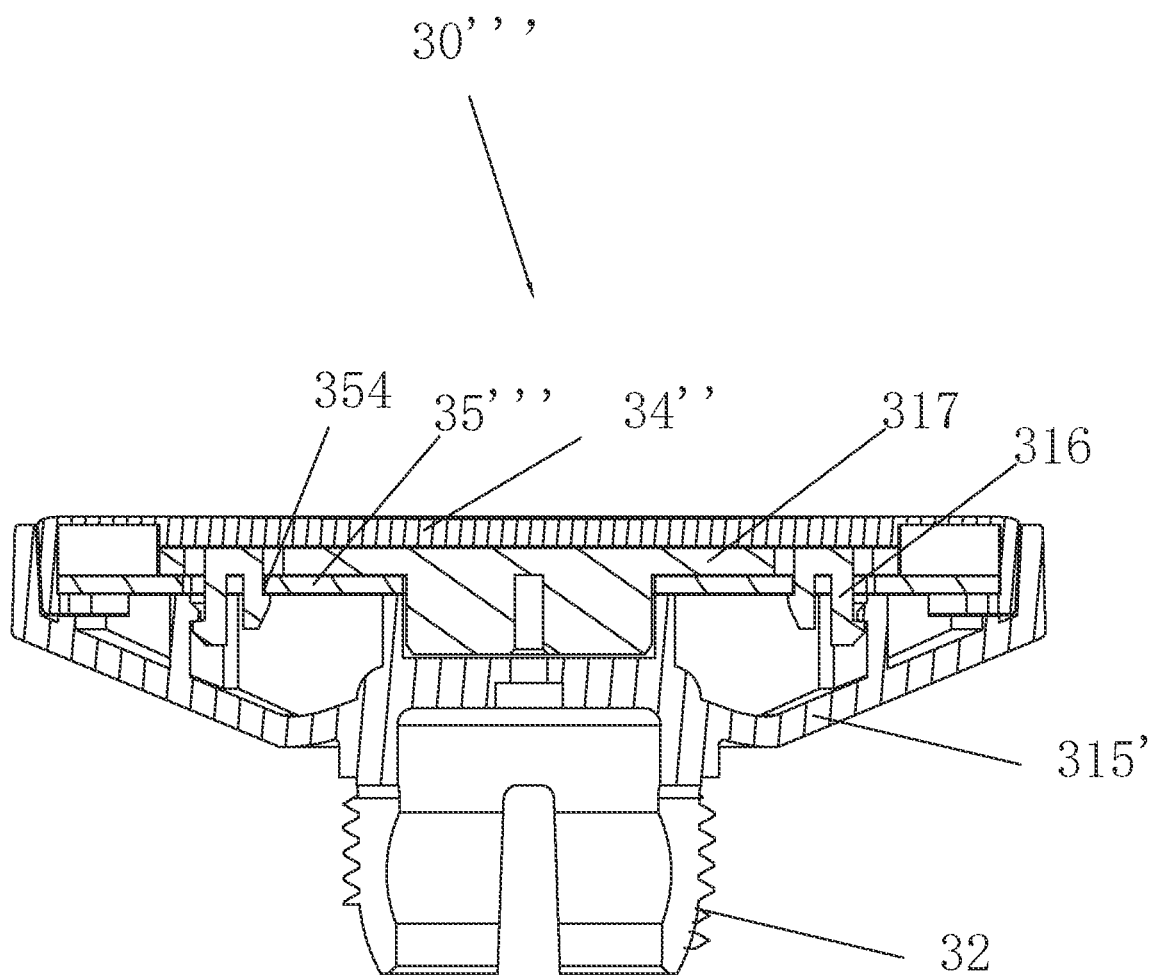
FIG. 14-16 illustrate an electronic device holder according to a fifth embodiment of the present application.
Figure 15:
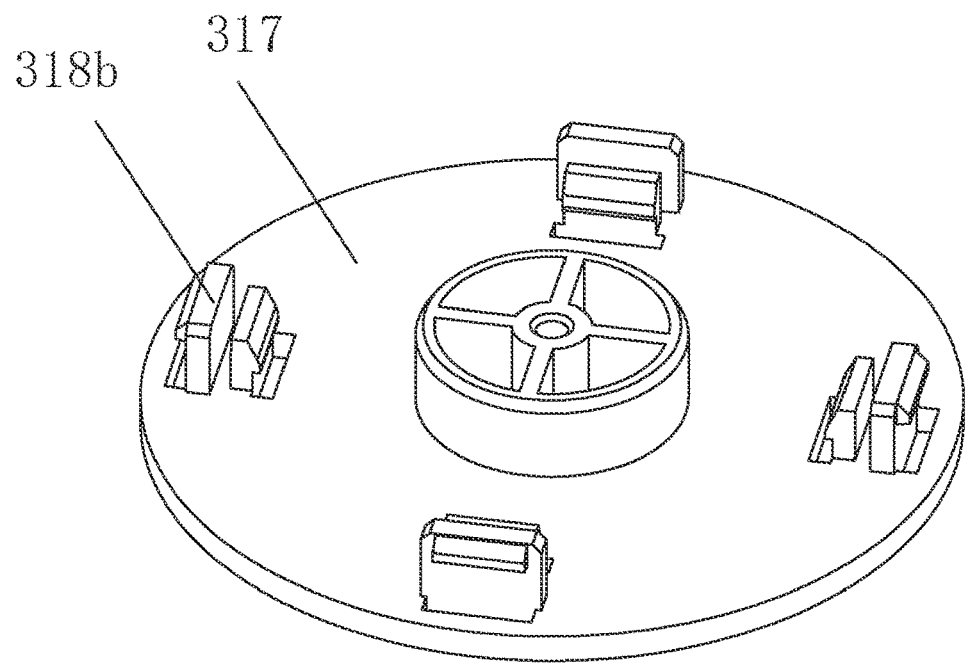

Referring to FIGS. 14-15, in some embodiments, the electronic device holder 30''' further comprises a fixing plate 317, and the mounting plate 35' is secured to the body 315' of the base via the fixing plate 317. Specifically, the mounting plate 35''' defines through holes 354, interlocking elements 318a/318b are respectively formed on the body 315' and the fixing plate 317, the interlocking elements 318b of the fixing plate 317 extend through corresponding through holes 354 of the mounting plate 35''' to engage with the interlocking elements 318a of the body 312. The interlocking elements 318a/318b can be hooks, barbs and so on.

Figure 16:
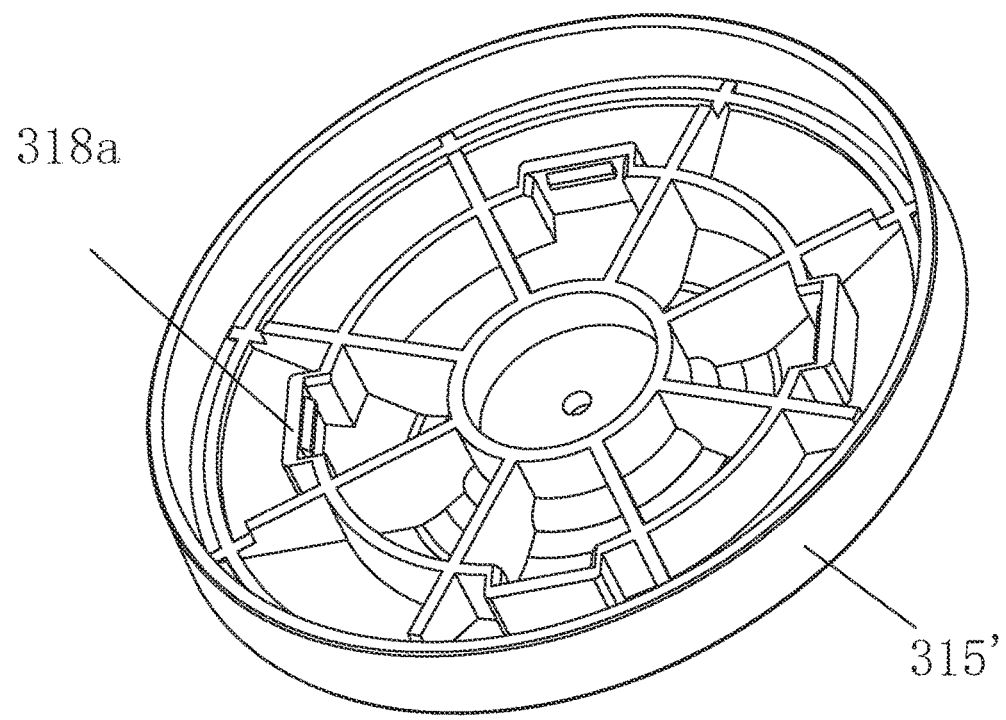
Figure 17:
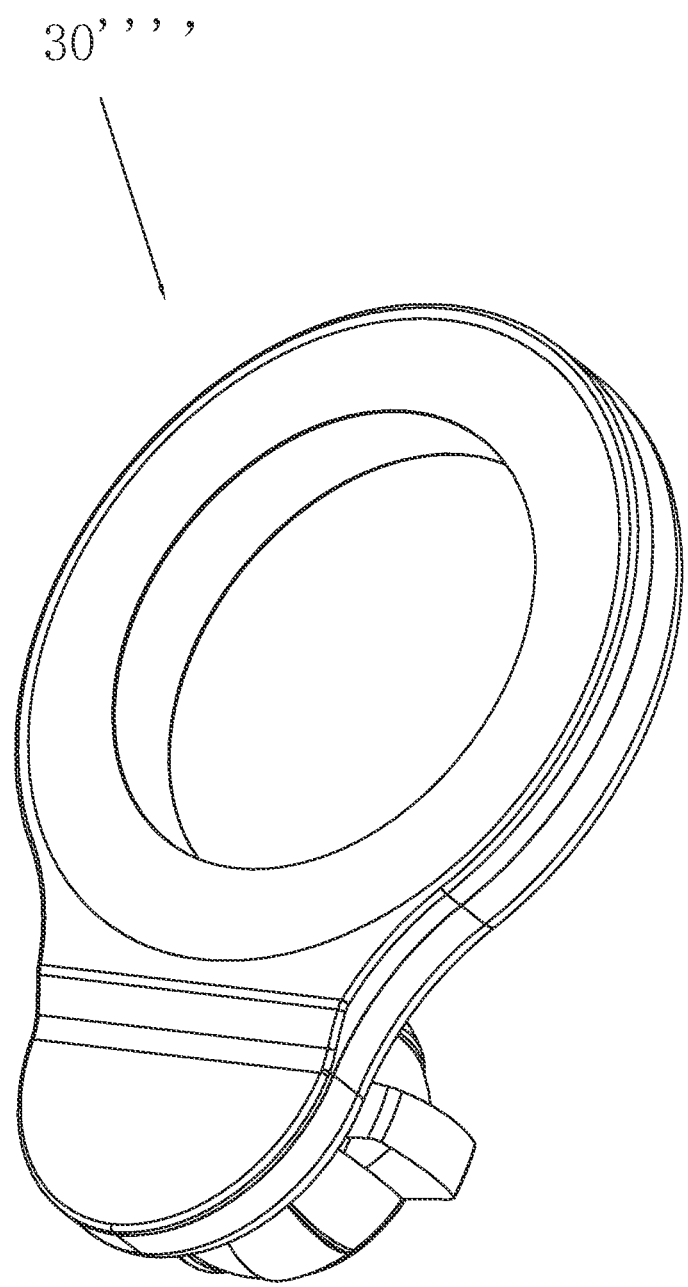
FIG. 17-19 illustrate an electronic device holder according to a sixth embodiment of the present application.
Figure 18:
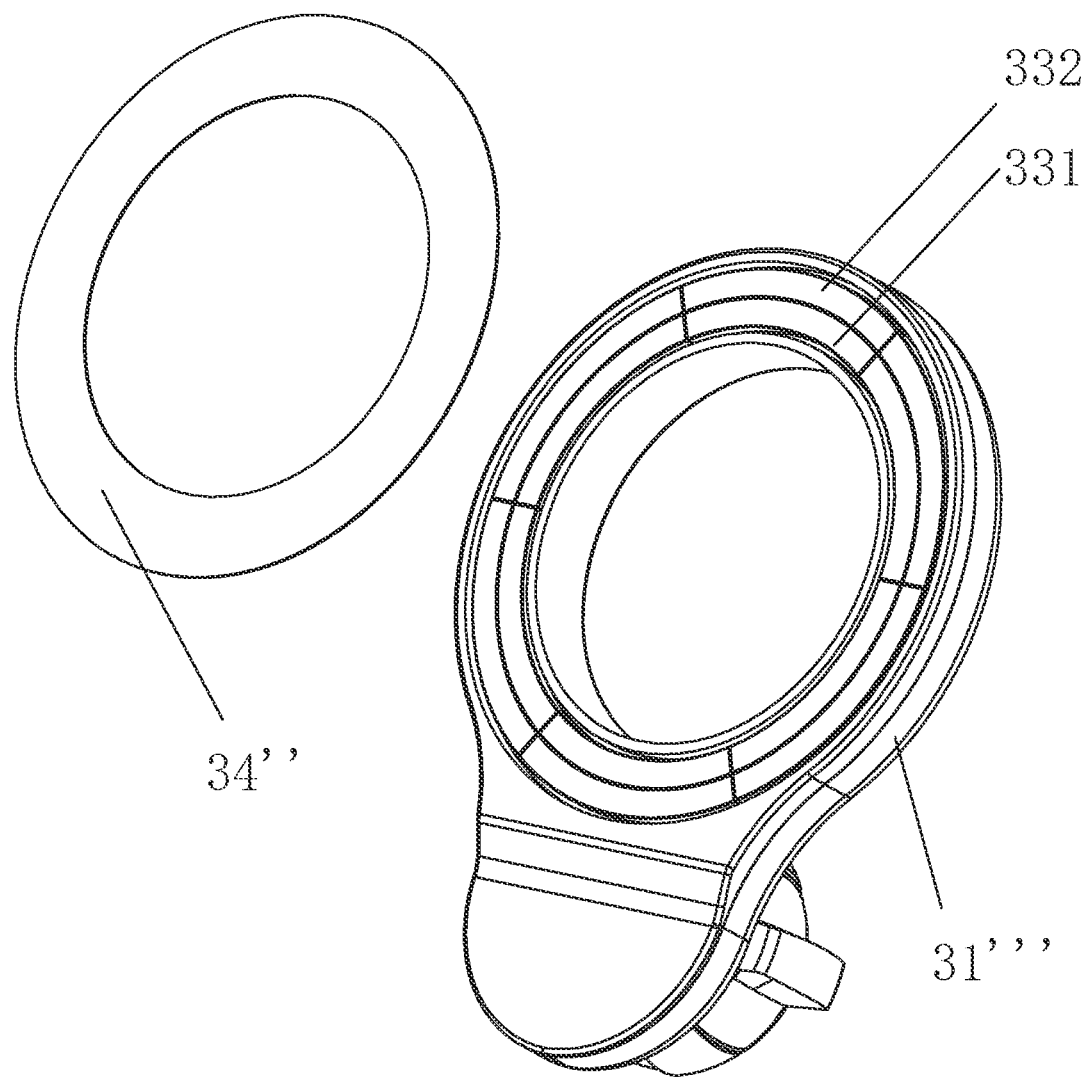
Figure 19:
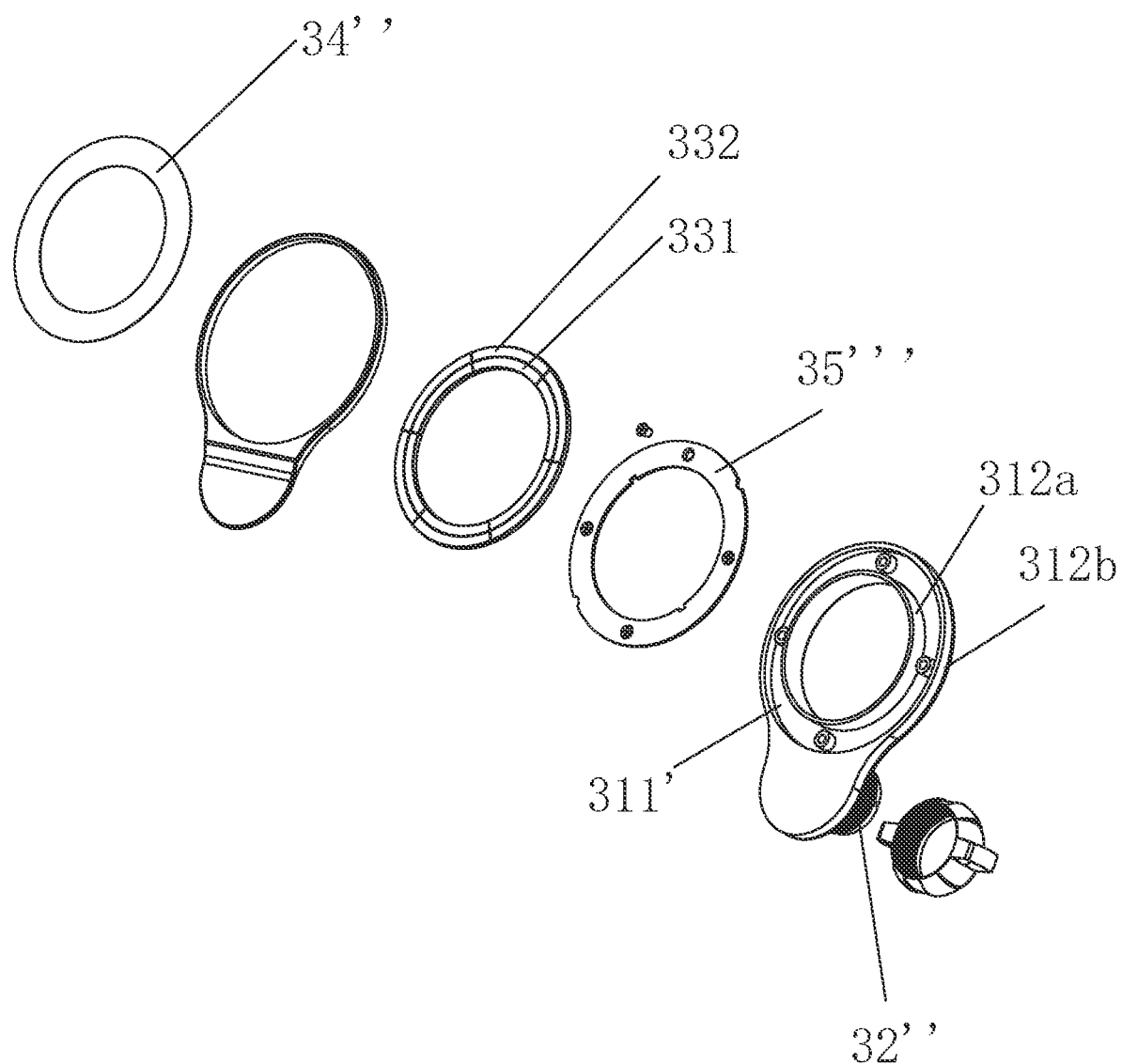

Referring to FIGS. 16-18, in some embodiments, the cover 34" of the electronic device holder 30"" comprises a top plate, the base 31''' comprises a ring-shaped bottom wall 311' with an inner peripheral edge and an outer peripheral edge, an inner circumferential sidewall 312a extending from the inner peripheral edge of the bottom wall 311', and an outer circumferential sidewall 312b extending from the outer peripheral edge of the bottom wall 311'. The bottom wall 311', the inner side wall 312a, and the outer side wall 312b cooperatively form an accommodating groove in which the ring-shaped second magnetic attraction member 33 and the ring-shaped mounting plate 35' are received. The ring-shaped mounting plate 35''' has a closed ring-shaped configuration and is secured to the bottom wall 311' of the base. The cover 34" covers an end, away from the bottom wall 311', of the second magnetic attraction member 33. The base 31''' further comprises an extension part 319 extending from the outer circumferential sidewall 312b, and the connecting portion 32" is formed on a side, opposite from the cover 34", of the extension part 319. The connecting portion 32" is configured to be secured to a mounting seat to thereby secure the electronic device holder together with the electronic device to the mounting seat.

Described above are merely specific embodiments of the invention, but the protection scope of the invention is not limited thereto. Any variations or substitutions readily conceivable to any person familiar with and skilled in the art should be included within the protection scope of the present invention. The protection scope of the invention shall be subject to the protection scope defined by the claims.

What is claimed is:

1. A holder configured to be detachably secured to an electronic device which comprises a first magnetic attraction member, the holder comprising:
   a case; and
   a second magnetic attraction member mounted to the case and configured to be attracted to the first magnetic attraction member in a first direction, the second magnetic attraction member comprising:
   a first magnet layer extending along a circumferential direction; and
   a second magnet layer disposed around the first magnet layer in the circumferential direction, the first magnet layer and the second magnet layer being separately formed;
   wherein the first magnet layer and the second magnet layer are polarized in an axial direction which is parallel to the first direction and perpendicular to the circumferential direction, and polarization directions of the first magnet layer and the second magnet layer are opposite to each other.

2. The holder according to claim 1, wherein the second magnetic attraction member has a thickness of 2 mm to 4 mm in the axial direction.

3. The holder according to claim 1, wherein the first magnet layer has an inner diameter less than 46 mm and equal to or greater than 44 mm; and
   the second magnet layer has an outer diameter greater than 54.1 mm and equal to or less than 56.1 mm.

4. The holder according to claim 1, wherein the first magnet layer comprises a plurality of first segmented magnets which are arranged along the circumferential direction, the second magnet layer comprises a plurality of second segmented magnets which are arranged along the circumferential direction, the first segmented magnets having a number which is the same as that of the second segment magnets;
   the second magnet layer has an inner diameter equal to or greater than the outer diameter of the first magnet layer;
   the first segmented magnets and the second segmented magnets are respectively stacked with each other in a radial direction.

5. The holder according to claim 1, wherein the case comprises a base and a cover which cooperatively form an accommodation space for accommodating the second magnetic attraction member therein, the cover is configured to be attached to the electronic device, and the base comprises a connecting portion formed at a side thereof opposite from the cover.

6. The holder according to claim 5, wherein the base comprises a ring-shaped bottom wall with an inner peripheral edge and an outer peripheral edge, an inner circumferential sidewall extending from the inner peripheral edge, and an outer circumferential sidewall extending from the outer peripheral edge, the bottom wall, the inner circumferential side wall and the outer circumferential side walls cooperatively form an accommodating groove in which the second magnetic attraction member is received, and the cover covers an end, away from the bottom wall, of the second magnetic attraction member.

7. The holder according to claim 5, wherein the base further comprises an extension part extending from an outer circumferential sidewall of the accommodation space, and the connecting portion is formed on a side, away from the cover, of the extension part.

8. The holder according to claim 5, wherein the base comprises a plurality of reinforcing ribs formed at an opposite side thereof opposite from the connecting portion.

9. The holder according to claim 5, further comprising a charging coil mounted to the base, wherein the second magnetic attraction member surrounds the charging coil.

10. The holder according to claim 9, wherein the second magnetic attraction member has an open ring-shaped configuration with a notch formed between two ends thereof.

11. The holder according to claim 5, wherein the base comprises a body, the connecting portion and the second magnet layer are respectively located at opposite sides of the body, the body forms a receiving chamber, the base further comprises a ball-shaped joint connected to the connecting portion and received in the receiving chamber, and a cushion is disposed between the ball-shaped joint and an inner sidewall of the receiving chamber.

12. The holder according to claim 1, further comprising a mounting plate configured to mount the second magnetic attraction member to the case, wherein ends of the first magnet layer and the second magnet layer away from the electronic device are coaxially mounted to a side of the mounting plate.

13. The holder according to claim 12, wherein the mounting plate has an outer diameter greater than or equal to that of the second magnet layer; or the mounting plate made of magnetic conductively material.

14. The holder according to claim 12, wherein the base comprises a body, the mounting plate is secured to the body via a fixing plate, the mounting plate defines through holes, interlocking elements are respectively formed on the body and the fixing plate, the interlocking elements of the fixing plate extend through corresponding through holes of the mounting plate to engage with the interlocking elements of the body.

15. A magnet assembly, comprising:
   an annular first magnet layer extending in a circumferential direction;
   an annular second magnet layer disposed around the first magnet layer in the circumferential direction, the first magnet layer and the second magnet layer being separately formed; and
   a mounting plate made of magnetic conductively material, the first magnet layer and the second magnet layer coaxially mounted to the mounting plate;
   wherein the first magnet layer and the second magnet layer are polarized in an axial direction which is perpendicular to the circumferential direction, and polarization directions of the first magnet layer and the second magnet layer are opposite to each other.

16. The magnet assembly according to claim 15, further comprising a case with an accommodating space, the mounting plate, the first magnet layer and the second magnet layer are accommodated in the accommodating space; and
   wherein the case comprises a cover and a base, the mounting plate is secured to the base, and the first magnet layer and the second magnet layer are secured between the mounting plate and the cover.

17. The magnet assembly according to claim 16, wherein the base comprises a ring-shaped bottom wall with an inner peripheral edge and an outer peripheral edge, an inner circumferential sidewall extending from the inner peripheral edge, and an outer circumferential sidewall extending from the outer peripheral edge, the bottom wall, the inner side wall and the outer side walls cooperatively forming the accommodating space in which the mounting plate, the first magnet layer and the second magnet layer are received, the cover covering ends, away from the bottom wall, of the first and second magnet layers, the mounting plate being secured to the bottom wall.

18. The magnet assembly according to claim 16, further comprising a wireless charging module configured to charge an electronic device, wherein the wireless charging module comprises a charging coil configured to generate an electromagnetic field when being electrified, a tray configured to mount the wireless charging module to the base, and a yoke configured to mount the charging coil thereon and to return magnet flux to the charging coil, and the mounting plate is fixed to the tray.

19. The magnet assembly according to claim 15, wherein the first magnet layer has an inner diameter less than 46 mm and equal to or greater than 44 mm; or
   the mounting plate has an outer diameter greater than or equal to that of the second magnet layer, and the second magnet layer has outer diameter greater than 54.1 mm and equal to or less than 56.1 mm; or
   the mounting plate has an open ring-shaped configuration with a notch defined between two ends thereof, a closed ring-shaped configuration, or a solid round configuration.

20. The magnet assembly according to claim 15, wherein magnet flux emitted from one of the inner magnet layer and the outer magnet layer returns back to another of the inner magnet layer and the outer magnet layer via the mounting plate.

* * * * *